United States Patent [19]

Carlsson

[11] 4,111,452
[45] Sep. 5, 1978

[54] AUTOMATIC COUPLING UNIT FOR BRAKING AND ELECTRICAL FUNCTIONS BETWEEN PARTS IN A VEHICLE COMBINATION

[76] Inventor: Hans Åke Ulf Carlsson, Torsgatan 93, 341 00 Ljungby, Sweden

[21] Appl. No.: 701,161

[22] Filed: Jun. 30, 1976

[30] Foreign Application Priority Data

Jul. 2, 1975 [SE] Sweden .............................. 7507595

[51] Int. Cl.² .................................................. B60D 7/02
[52] U.S. Cl. ..................................... 280/421; 214/620; 280/422
[58] Field of Search .................. 280/421, 420, 423 R, 280/422, 415 A; 214/620; 285/62

[56] References Cited

U.S. PATENT DOCUMENTS

| 2,924,464 | 2/1960 | Zajac et al. | 280/421 |
| 3,711,122 | 1/1973 | Holmberg | 280/421 |
| 3,881,619 | 5/1975 | Morris | 214/620 |
| 3,888,513 | 6/1975 | Pilz | 280/421 |

Primary Examiner—John A. Pekar
Attorney, Agent, or Firm—Robert E. Burns; Emmanuel J. Lobato; Bruce L. Adams

[57] ABSTRACT

A connector system for coupling the electrical and brake systems of a tractor vehicle with those of a trailer to be towed by the tractor vehicle. The coupling is done automatically at the time the tractor vehicle couples to the trailer. The connector system has a female receptacle having therein connectors from the electrical and braking systems to the trailer. A male unit having therein connectors from the electrical and braking systems of the tractor is lifted automatically vertically for insertion into the female receptacle. When the insertion is made the various connector carry out connections connecting the electrical and braking system of the tractor vehicle to those of the trailer.

6 Claims, 7 Drawing Figures

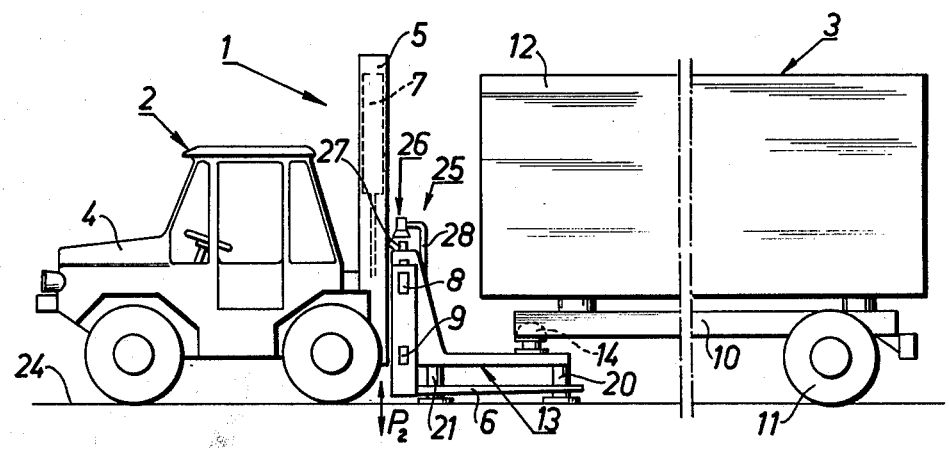

AUTOMATIC COUPLING UNIT FOR BRAKING AND ELECTRICAL FUNCTIONS BETWEEN PARTS IN A VEHICLE COMBINATION

BACKGROUND OF THE INVENTION

The present invention refers to an automatic coupling unit for braking and electrical functions between parts in a vehicle combination.

Rational modern goods-handling technology today offers aids for the transport of large and heavy loads. Containers with weights up to 20 tons or more are usual, and within a sawmill area, for example, there are very large and heavy timber packets. Accordingly, the transport method intails that a container or a packet of timber is handled as a unit which is moved between different stations on specially built transport trailers which can be connected to and towed by a truck or the like. Such a transporting unit will thus consist of a vehicle divided into two, or in exceptional cases three parts with a prime mover and one or alternatively two load units.

The normal handling picture is then that one and the same truck serves several load units which during intervals between haulage are set up at loading bays or similar intermediate stations. In other words, a truck can freely operate within an area for taking away or bringing up the load units, travel on public highways being also usual. Independent of the kind of transport area applicable public regulations for vehicles must be applied, relating for example to braking and lighting functions on the load unit. In its turn, this means that the load unit must be coupled to the prime mover both with regard to braking function and electrical function and that suitable couplings for these systems must be arranged between the two parts of the vehicle combination so that the truck driver can manoeuvre the whole unit solely by operations from the driver's cabin.

The solutions to date for coupling units between two vehicle parts of the kind stated are of conventional type with a male part and a female part which can be quickly put together by hand. As a rule this operation requires however that the truck driver has to get down from the prime mover both for coupling together and taking apart the connecting means. Since the number of goods movements for a prime mover can be considerable during a working shift, this means continuously repeated time losses for the coupling operation, which will be inconvenient and will negatively affect haulage capacity.

SUMMARY OF THE INVENTION

According to the present invention, which solves this problem in a simple and rational manner, both making and breaking the coupling between two parts of a vehicle combination with respect to braking and electrical functions automatically by a combined means having a male and female part. The male part is preferably arranged on the prime mover and the female part on the load unit. The male and female parts are respectively provided with connecting means for braking and electrical function, congruently placed for mutual coaction when the male is introduced into the female part. The female part is firmly mounted on the load unit with its geometrical coupling axis substantially vertical while the male part is similarly vertically mounted movable on the prime mover. When the prime mover is manoeuvred into transporting position, i.e. in position for coupling to the load unit, the female part is situated coaxially above the male part. When coupling the braking and electrical functions, the male part, in response to operations from the driver's cabin, is moved upwardly a predetermined distance and into the female part so that connections between the electrical and braking systems of the prime mover and the load unit are made. Disconnection of the coupling between both systems takes place analogously by the male part being moved downwards in response to operation from the driver's cabin.

The coupling unit according to the invention is applicable with particular advantage to a conventional forklift truck as prime mover in combination with a load unit with a rearwardly placed wheel system and a forwardly placed support, which in the parking position for the load part supports the forward portion of the unit and during transport forms a carrying and towing connecting link between the forklift truck and the load unit. This form of application is shown as an embodiment example in the following description. The automatic coupling unit according to the invention can also be used for another type of prime mover, however, in combination with a load unit arranged with a two-wheel system. In which case, the prime mover only needs to be equipped with a pneumatic or hydraulic means, e.g. a pressure cylinder, which sets the position of the coupling unit male part on a command from the driver's cabin.

The distinguishing features of the invention are apparent from the followng patent claims.

BRIEF DESCRIPTION OF THE DRAWINGS

In the following description an embodiment of the invention is described as an example while referring to the appended drawings.

FIG. 1 shows in side view a vehicle combination comprising a forklift truck as the prime mover for a load unit with a rearwardly placed wheel system and a forwardly placed end support designed for connection to the truck, there being an automatic coupling unit according to the invention arranged between the truck and the end support.

FIG. 2 is a horizontal projection of the vehicle combination according to FIG. 1 and FIG. 3, showing in greater detail a section along the line III—III in FIG. 2 of the automatic coupling unit and end or forward support.

DESCRIPTION OF THE PREFERRED EMBODIMENTS

Figure 4:
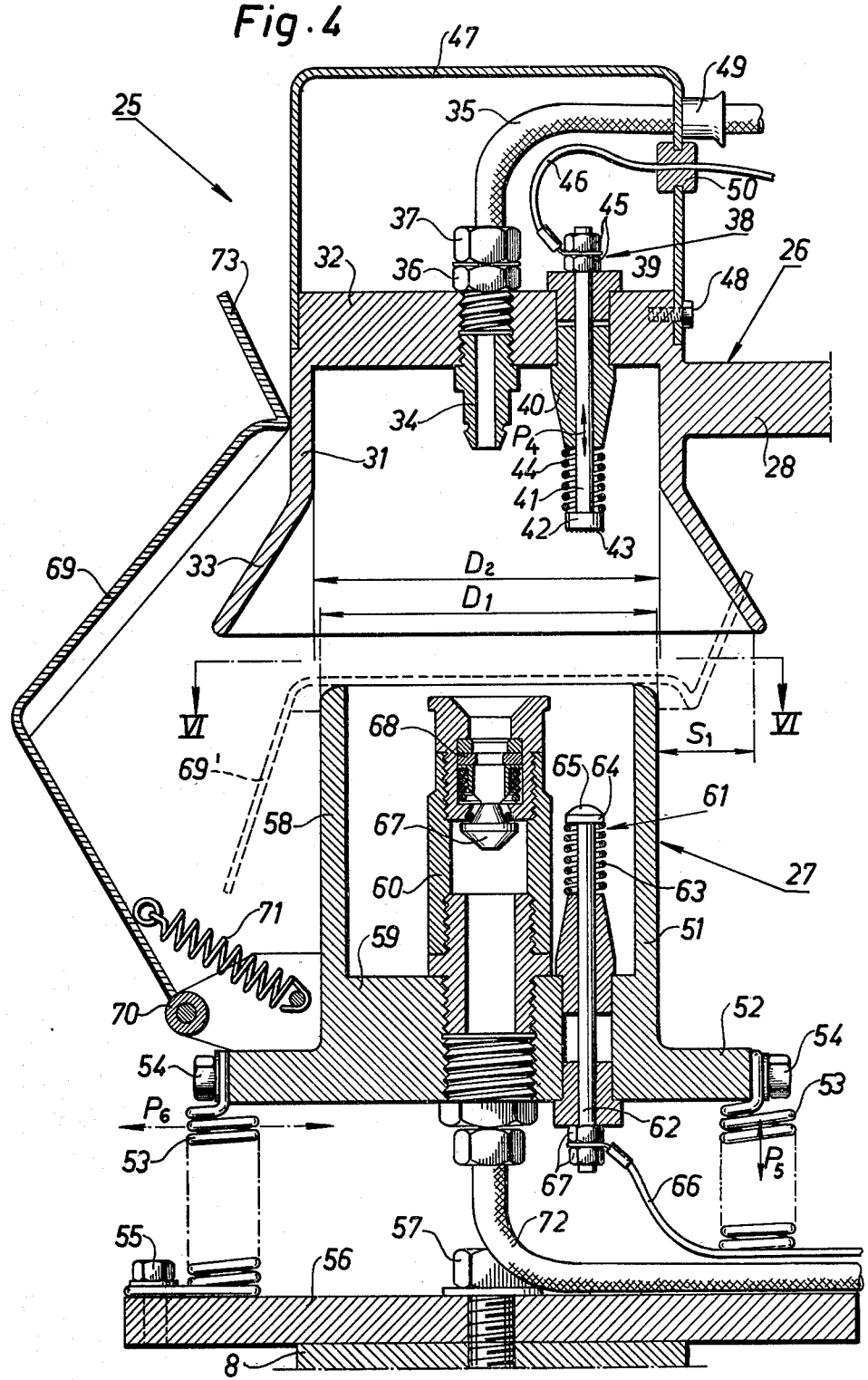
FIG. 4 is a section to an enlarged scale along the line IV—IV in FIG. 2 and shows a male part and a female part of the coupling unit in position immediately before being connected together.

In FIG. 1, a two-part vehicle combination generally designated with the numeral 1 consists of a prime mover 2 and a load unit 3. The prime mover is shown as a forklift truck 4 with an elevating mast 5 in which lifting forks 6 are elevatable or lowerable in a known way by means of a hydraulic or pneumatic pressure cylinder 7. In a similarly known way the lifting forks are arranged on a fork carriage (not shown in detail) with horizontal transverse beams 8,9 on which they can be moved sideways according to the double arrow P1 in one and the same horizontal plane simultaneously as they are elevated or lowered via the carriage according to the double arrow P2.

The load unit 3 is shown in FIGS. 1-3 as a trailer with a chassis 10 with a rearwardly placed wheel system 11. A load rests on the chassis 10, consisting for example of a container 12, a forward end of the chassis being carried by an end or forward support 13 via a ball coupling 14 which allows universal attitude relationships between the forward support with coupling 14 and the chassis 10 while it functions at the same time as towing force transferring element between the prime mover 2 and the load unit 3.

The forward support 13 in the case shown is designed as a fabricated frame with a substantially horizontal bottom portion 15 and two vertical carrying arms 16,17 each provided with two heavy carrying hooks 18,19. Under the bottom portion 15 there are arranged three feet 20,21 with three base plates 22 and 23, respectively, so that the forward support 13 rests on the ground 24 at three points in the parking position for the load unit 3. It is also evident that in the embodiment shown the load unit 3 will be supported at three points and that in the parking position it rests on the wheel system 11 and via the ball coupling 14 on the forward support 13 which rests on the ground 24 via the three base plates 22,23.

The coupling unit according to the invention, generally designated 25 is arranged with a female part 26 mounted on the forward support 13, preferably on one of the carrying arms 16, 17 and has a male part 27 mounted on one of the transverse beams 8,9. In the embodiment shown, the female part 26 is mounted on the carrying arm 16 via a holder 28 having elongate screw holes 29 for enabling the most favourable height adjustments of the holder 28 according to the double arrow P3 during assembly, whereafter it is fixed with the screws 30. Moreover, the male part 27 is shown mounted on the upper transverse beam 8 of FIGS. 1-3 and in such a position that when the prime mover 2 is driven into place for hauling the load unit 3 as shown in FIG. 1, 2 the male part 27 and female part 26 will lie coaxially.

Figure 5:
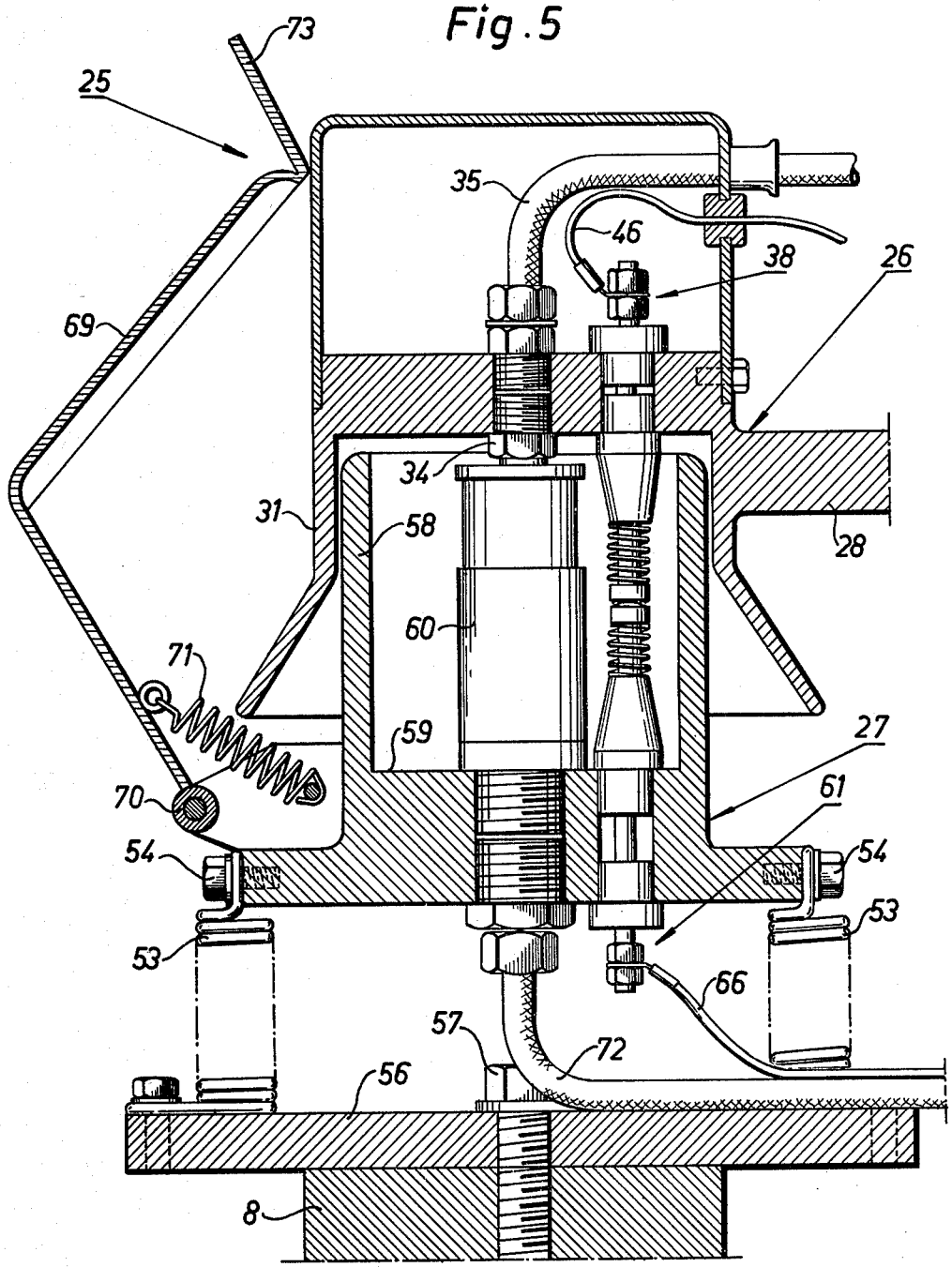
FIG. 5 shows in conjunction with FIG. 4 the connected male and female parts, whereat the means incorporated therein for transmitting braking and electrical functions for the prime mover and the load unit in the vehicle combination according to FIG. 1 are united with each other.

The design of the coupling unit 25 is clear from the embodiment example shown in section in FIGS. 4 and 5, whereat FIG. 4 indicates in principle the position apparent from FIG. 1, i.e. the relative position between the female part 26 and the male part 27 when the prime mover has been manoeuvered into position for coupling to and transporting the load unit 3. FIG. 5 shows a coupling position for the coupling unit 25 in which the male part 27 is inserted in the female part 26, both braking and electrical functions of the parts in the vehicle combination being thus united with each other.

The female part 26 comprises a downwardly directed bell-shaped body 31 with a base 32 and an outwardly diverging funnel-like portion 33. In the base 32 there is arranged a first connecting part 34 to a conventional quick-release coupling for a pressure fluid, a flexible hose 35 with connecting nipple 36 and nut 37 transmitting the pressure fluid to the braking means on the load unit 3. In the base 32 there is further mounted an electrical union 38, comprising two transfer bushings 39,40 of electrically insulated material in which a contact rod 41 is arranged with a running fit for displacement axially according to the double arrow P4. The contact rod 41 is provided with a contact head 42 with a suitably knurled contact surface 43 and is kept by a pressure spring 44 in a downward end position in FIG. 4, whereby terminal nuts fastening an insulated lead 46 going to the load unit 3 form a stop for the contact rod 41 in this end position.

FIG. 4 also shows that the previously mentioned holder 28 is provided with the body 31 and that this is also provided with a protective cover 47 retained by screws 48 and provided with grummets 49,50 for the hose 35 and the electrical lead 46.

The male portion 27 also comprises a body 51 with an attachment flange 52 and is supported by a number of helical springs 53, suitably at least three, which at an upper end in FIG. 4 are attached to the flange 52 by means of screws 54. At their lower ends, the helical springs 53 are attached by means of screws 55 to a carrying plate 56 which in turn is rigidly attached by means of screws 57 to the upper transverse beam 8 of the prime mover 2.

The body 51 is made with a tubular portion 58 having an outside diameter $D_1$ which is somewhat less than an inside diameter $D_2$ in the body 31 of the female part 26. In a bottom portion 59 of the body 51 there are arranged in corresponding positions a second connecting part 60 for the pressure fluid and an electrical contact means 61 corresponding to the previously described contact means 33 and thus having a contact rod 62 actuated by a compression spring 63 which moves the contact rod 62 to an upper end position shown in the figure, this rod having a contact head 64 with a preferably somewhat domed contact surface 65. An insulated electrical lead 66 is connected to the contact rod 62 by means of terminal nuts 67 and is further united to the two electrical systems of the load unit.

The second connecting part 60 is of known construction and comprises a valve 67 which is self-closing under the action of the pressure fluid but which is put into the open position when the first connecting part 34 is inserted into the second connecting part 60, there being an elastic gland for sealing between both parts.

The male part 27 is further provided with a pivotable lid 69 as shown in FIG. 4, which is hingedly arranged on the body 51 by means of a mounting 70, the lid being urged, without the female part in position above the male part, by a spring means 71 into the position shown with dashed lines 69', in which position the lid 69 protects the vital portions of the male part 27 from rain, dirt and the like.

It is also apparent from FIG. 4 that a flexible hose 72 is connected to the second connecting part 60, the other end of the hose being connected to the pressure fluid system of the prime mover 2.

The helical springs 23 are so dimensioned and made that they allow a certain amount of springing in their longitudinal direction as indicated by the double arrow P5 simultaneously with a large free movement sideways for the spring end mounted on the attaching flange 52, i.e. according to the double arrow P6. This means that the body 51 will be capable of parallel motion relative to the carrying plate 56 and thereby also to the transverse beam 8. In practical trials it has been found suitable to make the springs 53 so that the male part 27 can be moved sideways relatively unobstructed a distance $S_1$ from a coaxial position shown in FIG. 4, whereby the distance $S_1$ can amount to about 40 mm in all directions. If therefore the coaxial position does not occur when uniting the male with the female part, a relative sideways position of up to 40 mm can be accepted for them without obstructing coupling procedure.

In connecting or disconnecting the coupling the device functions in the following manner. It is assumed that the load unit 3 is parked with the forward support 13 resting on the ground 24. The fork truck 4 is advanced with its tines 6 lowered to a bottom position, the transverse beams 8,9 also being in a lower position shown by dashed lines 8',9' in FIG. 3, such that they are completely under the lifting hooks 18,19 of the forward support 13. In manoeuvering into a final position for the truck 4 the transverse beams 8,9 will lie against the carrying arms 16,17 on the forward support 13. The truck forks are then elevated whereby the carrying hooks 18,19 hook over the transverse beams 8,9. After further elevation of the truck forks, the forward support 13 will be lifted up via the carrying hooks 18,19 a suitable distance S2 above the ground 24, whereby the vehicle combination is ready for moving off.

The forks 6 are arranged together with a hydraulic system (not shown) in such a way that they can, during movement of the truck 4 into the transporting position, be moved apart lie with a generous play on either side of feet 20 on the forward support 13. Accordingly, the driver manoeuvres the truck as accurately as possible to the described position for elevating the carriage, i.e. the transverse beams 8,9 which also involves the female part 26 of the coupling unit 25 coming as exactly as possible over the male part 27, although the previously mentioned sideways tolerance, the distance $S_1$, may be allowed. While elevating the transverse beams 8,9 to the final position shown in FIG. 3 the male part 27 has been inserted into the female part 26 to the coupling position shown in FIG. 5. The lid 69 which initially covered the male part 27 has now been automatically moved to one side by the female part 26 during the manoeuvering of the truck to the transporting position and assumption of the position shown in FIG. 4.

In the coupling position shown in FIG. 5 both the connecting parts 34, 60 for the pressure fluid have been inserted in each other so that there is free flow between the hoses 72 and 35. The electrical contact means 38,36 are similarly united with each other by the contact heads 42,64 on the contact rods 71,62 being urged against each other by the helical springs 44,63. It will be appreciated that the length of the contact rods must be so adjusted that suitable springing is obtained.

To facilitate manoeuvering the truck 4 into the correct coupling position, especially with relation to coaxially of the female part 26 and the male part 27, these are moved to one side in relation to a centre line for the vehicle combination. The driver is thereby enabled, without the pressure cylinder 7 in FIG. 2 curtailing his view in the direction of the arrow P7, to observe the sideways positional relationship between both parts of the coupling unit 25 and to correct the advance of the truck accordingly.

As previously mentioned, the height of the female part 26 in relation to the male part 27 is adjusted once and for all on assembly, utilizing the elongate holes 29 in the holder 28. It is thereby taken for granted that all forward supports 13 provided with coupling units have female parts located at the same height. Since certain height tolerances must be allowed in practice, the springs 53 are not tightly wound but allow a certain amount of movement for the male part 27 according to the double arrow P5. This means that the female part and male part will be pressed together with a certain predetermined urging force from the springs 53, whereby injurious overload on the coupling parts is avoided.

After moving the loading unit 3 and when the prime mover 2 is to be uncoupled, the described operations are carried out in reverse order, signifying that the truck forks are lowered so that the forward support 13 is resting against the ground 24, whereafter the forks are further lowered sufficiently to allow the transverse beams 8,9 to come below the carrying hooks 18,19. Simultaneously to this the male part 27 is automatically pulled out from the female part 26, whereon the valve 67 in the connecting part 60 closes and the electrical connection via the contact means 38,61 is broken. The prime mover 2, can then be driven away from the load unit 3, whereon during the first part of movement the lid 69 automatically snaps over the male part 27 to cover it over at the top as shown with the dashed line 69' in FIG. 4. So that the lid 69 will positively be guided about the mounting 70 during opening and shutting, a projection 73, at angle to its main plane, is arranged on the lid for sliding against an outer side of the female part 26.

Figure 6:
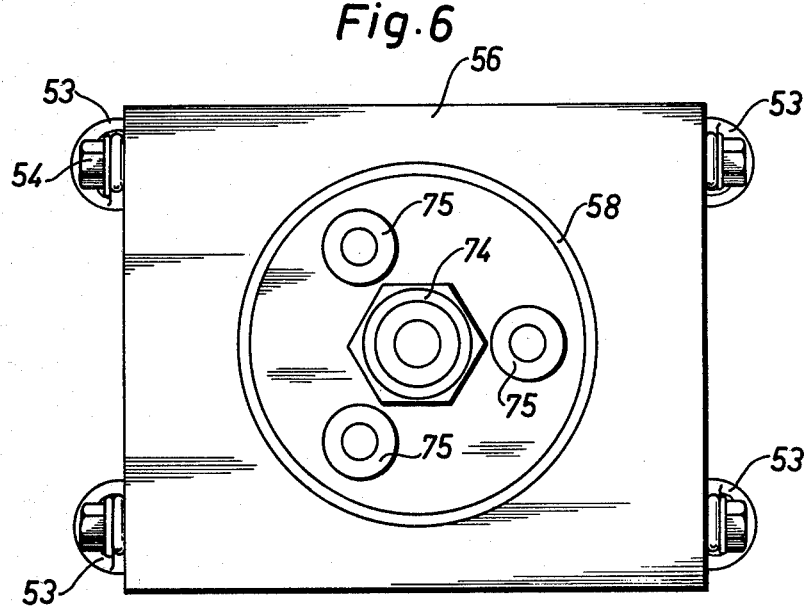
FIGS. 6 and 7 show in plan along the line VI—VI in FIG. 4 different configurations of the transmitting means for the braking and electrical functions in the male part of the coupling unit.

In the described embodiment a male and female part have been shown with transmitting means for a pressure fluid hose and an electric lead. In practice, however, there is generally a demand for more lines. Accordingly, in FIG. 6 there is shown in plan a male part with a pressure fluid coupling 74 and three electrical contact means 75, the latter being evenly distributed around the pressure fluid coupling 74. In this case one contact means 75 can be used for the negative lead and both the others for positive leads to rear lights and braking lights respectively.

Figure 7:
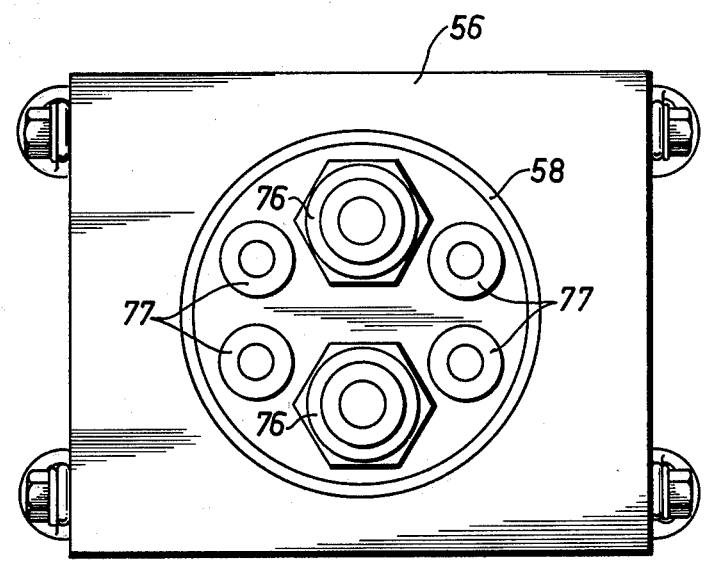

In FIG. 7 there is shown an alternative arrangement with two pressure fluid couplings 76, of which one can be utilized for a feed line and the other for an operating line. Four electrical contact means 77 are further shown, of which three can be utilized analogously to the arrangement according to FIG. 6 and the fourth can be used as a contact means for a working light for example. For the remainder, it is understood that different alternative arrangements can be applied both with regard to number as to placing of the described connecting means, all according to the requirements involved in practice.

In the description a pressure fluid has consistently been disclosed as the impulse transmitting medium between the prime mover and the load unit. It is, however, quite obvious that known vacuum systems can be utilized or a combination of vacuum and positive pressure, whereat the latter can be utilized as operating medium. Two fluid couplings 76, FIG. 7 are naturally required for the latter solution. It will also be appreciated that if vaccum is used, the valve 56 in the coupling part 60 FIG. 4, must be self-closing against vacuum, which is a construction known per se.

The coupling unit 25 according to the invention has been associated in the description with a fork truck 4 as prime mover and a load unit 3 with a wheel system 1 and an end support 13. It is, however, to be understood that the prime mover 2 can also consist of a conventional truck or lorry and the load unit of a trailer with two-wheel systems. In which case the holder 28 for the female part 26 is mounted on a coupling device between both parts of the vehicle combination, while the male portion 27 is mounted on a means on the lorry displaceable in response to operations from the driver for making and breaking the coupling. These measures then involve separate operations which can, however, be carried out without the driver having to leave his place.

What I claim is:

1. A coupling unit for releasably coupling a tractor vehicle and a trailer towed by said tractor vehicle comprising; a lift structure connectable to a tractor vehicle for movement upwardly and downwardly; said lift structure having support means for connection to a trailer for towing by the tractor vehicle and movable upwardly and downwardly relative to said lift structure; a connector system for automatically connecting braking and electrical systems of the tractor vehicle and the trailer; said connector system comprising, a female receptacle on said support means having therein separate first connector elements connected to the braking system and to the electrical system respectively of said trailer and a male unit on said lift structure having therein separate second connector elements connected to the braking and electrical systems respectively of said tractor vehicle, said first connector elements and said second connector elements each comprising means for automatically effecting connection to a corresponding one of the connector elements of a respective system when the male unit is inserted into the female receptacle a given extent as said lift structure is lifted relative to the female receptacle with the male unit coaxial with the female receptacle and for automatically effecting disconnection as the support means of the lift structure is lowered.

2. A coupling unit according to claim 1, in which said female receptacle is open downwardly and said male unit extends upwardly and is aligned vertically with said female receptacle.

3. In combination; a towing tractor vehicle; a trailer towable by said tractor vehicle; a coupling unit having means for releasably connecting it to the tractor vehicle and support means relatively movable upwardly and downwardly having means for connecting said trailer thereto; means for selectively moving said support means upwardly and downwardly; a connector system for automatically connecting and disconnecting both braking and lighting systems of the tractor vehicle to the trailer; said connector system comprising on said coupling units a female receptacle open downwardly having therein separate first connector elements connected to electrical and braking systems respectively of one of said tractor vehicle or said trailer and an upstanding male unit on said moving means having therein separate second connector elements connected to electrical and braking systems respectively of said tractor vehicle, said first connector elements and said second connector elements each comprising means for automatically effecting connection to a corresponding one of the connector elements of a respective electrical or braking system when the male unit is inserted into the female receptacle as the moving means is lifted relative to the female receptacle with the male unit coaxial with the female receptacle and for automatically effecting disconnection as the support means is lowered.

4. The combination according to claim 3, in which said female receptacle is cup-shaped and open downwardly, said first connector elements being housed in said female receptacle, and in which said male unit is open upwardly and in which said second connector elements are housed.

5. The combination according to claim 4, including means on said coupling unit for adjusting the vertical distance between said male unit and the female receptacle.

6. The combination according to claim 4, including a pivoted lid covering said male unit and having means for engagement by said female receptacle for opening the lid when the tractor is aligned with said support means, and means biasing the lid to a position covering and closing said male unit, thereby enclosing said second connector elements for protection thereof.

* * * * *